July 23, 1957     A. MILLER     2,800,201
ANTISKID DEVICE FOR VEHICLES

Filed Jan. 18, 1954     3 Sheets-Sheet 1

Abba Miller
INVENTOR.

BY *Clarence A. O'Brien*
*and Harvey B. Jacobson*
Attorneys

Abba Miller
INVENTOR.

July 23, 1957　　　A. MILLER　　　2,800,201
ANTISKID DEVICE FOR VEHICLES
Filed Jan. 18, 1954　　　　　　　　　　3 Sheets-Sheet 3
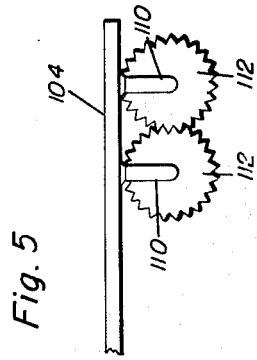
Fig. 5
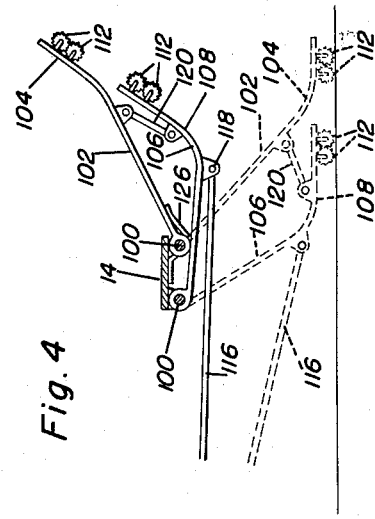
Fig. 4
Fig. 3
Abba Miller
INVENTOR.

United States Patent Office 2,800,201
Patented July 23, 1957

2,800,201

ANTISKID DEVICE FOR VEHICLES

Abba Miller, Cleveland Heights, Ohio

Application January 18, 1954, Serial No. 404,751

9 Claims. (Cl. 188—5)

This invention relates in general to improvements in safety devices for vehicles, and more specifically to an antiskid device for vehicles.

When a vehicle is moving down an icy or snowy road and goes into a skid, there is little a driver of such vehicle can do to pull the vehicle out of such skid. It is therefore the primary object of this invention to provide an improved antiskid device which may be conveniently attached to vehicles, the antiskid device being of such a nature so as to automatically counteract the skidding of the rear of a vehicle to one side.

Another object of this invention is to provide an improved antiskid device for vehicles which is of a relatively simple construction and which is of such a nature whereby it may be quickly and easily attached to a conventional vehicle without making any undesirable alterations in the vehicle.

Another object of this invention is to provide an improved antiskid device for vehicles which is automatic in operation and which includes means responsive to the skidding of vehicles for applying antiskid elements to a surface over which the vehicle is passing.

A further object of this invention is to provide an improved antiskid device for vehicles which may be selectively moved from an operative position to an inoperative position with a minimum of time and effort required.

A still further object of this invention is to provide an antiskid device for vehicles which includes a device for limiting forward skidding of the vehicle, the device being attachable to a brake pedal of a vehicle and controllable thereby.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a fragmentary perspective view showing a major portion of the antiskid device and the general relationship of the various parts thereof;

Figure 1:
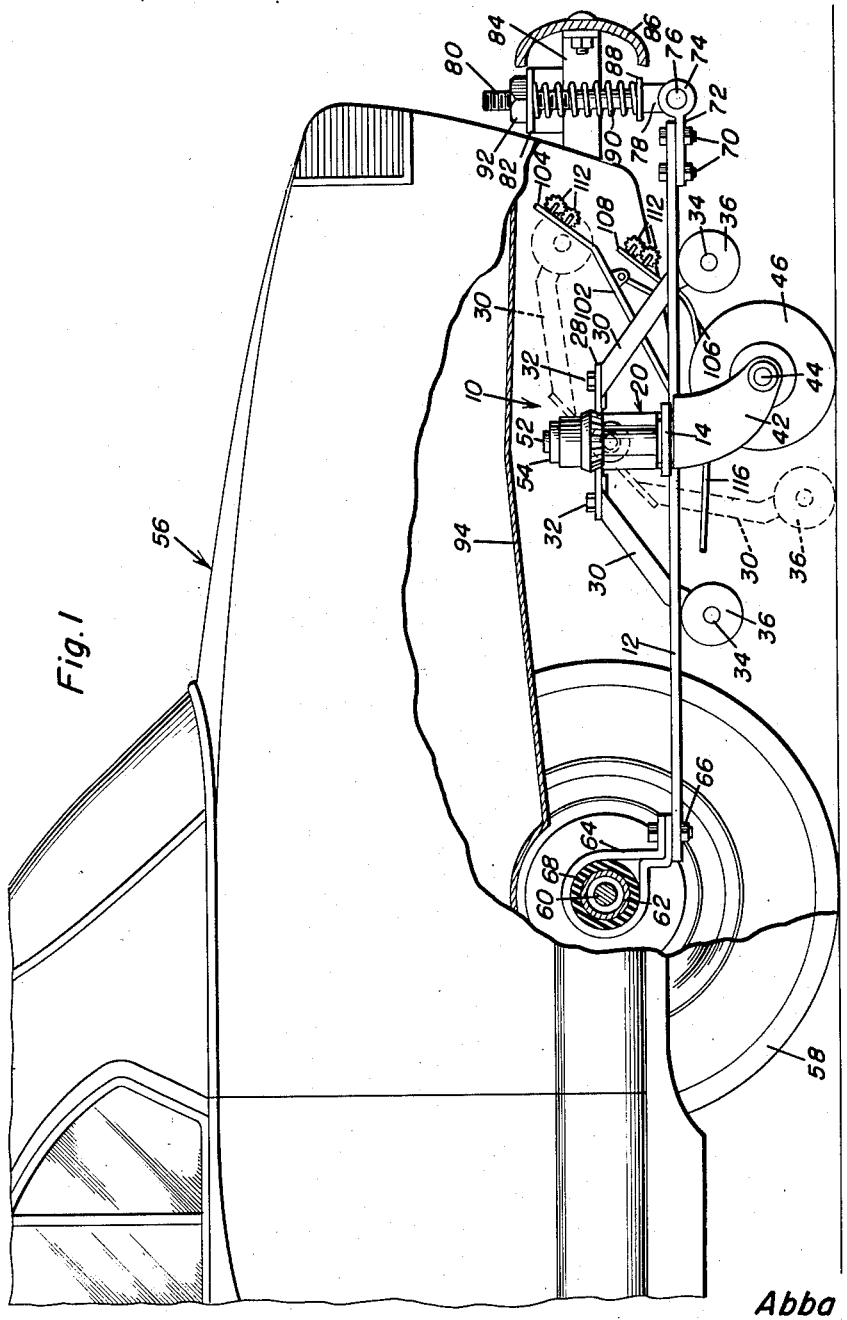
Figure 1 is a fragmentary side elevational view of the rear portion of a conventional vehicle, portions of the vehicle being broken away and shown in section in order to clearly illustrate the relationship of the antiskid device carried by the rear of the vehicle, an operative position of the antiskid device being shown by dotted lines.
Figure 2:
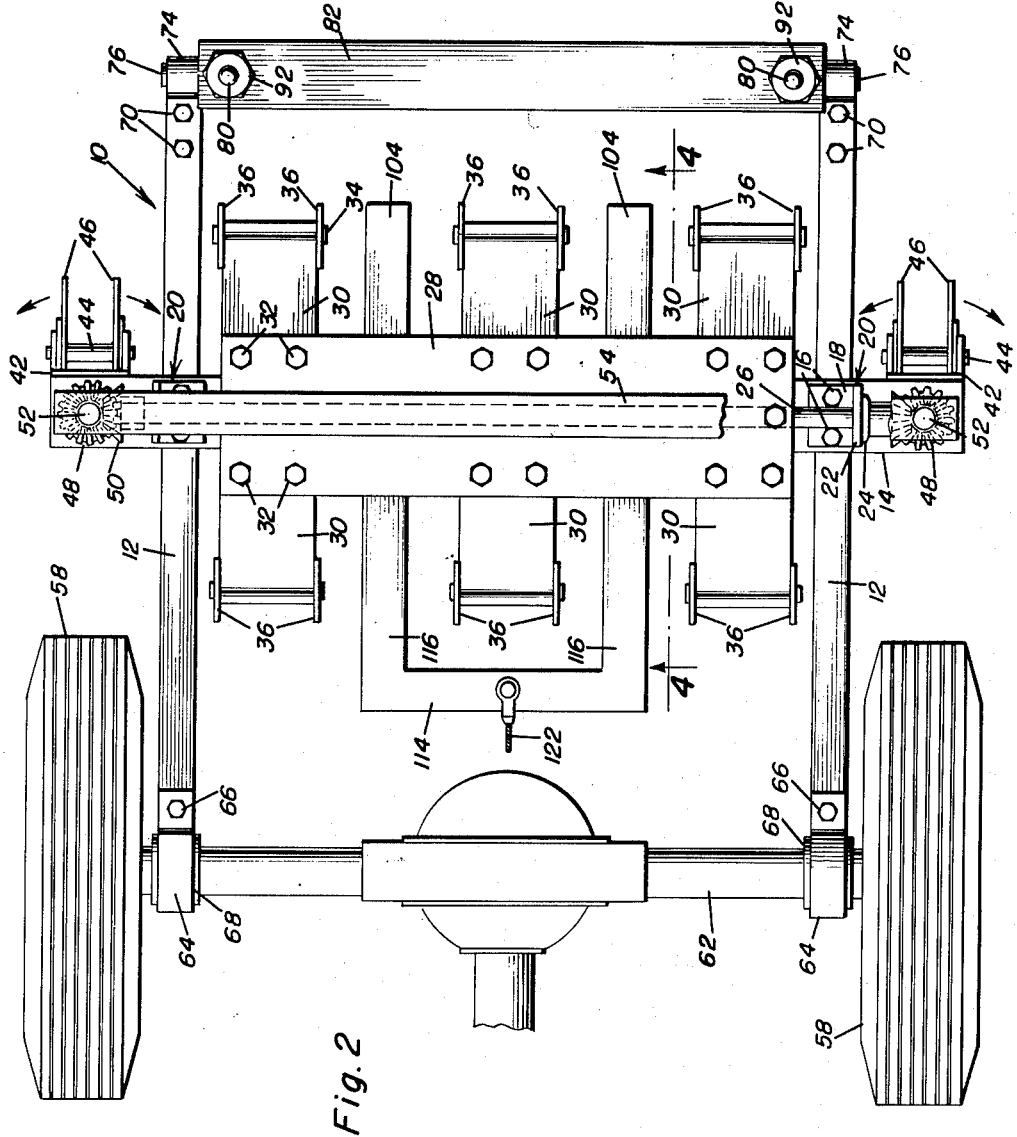
Figure 2 is a top plan view of the antiskid device of Figure 1 and shows the relationship thereof with respect to the rear axle and rear wheels of a vehicle, the body and other portions of the vehicle being omitted for purposes of clarity.

Figure 4 is a fragmentary vertical sectional view taken substantially upon the plane indicated by the section line 4—4 of Figure 2 and shows the general construction of the device for preventing forward skidding of the vehicle, the operative position of the device being shown in dotted lines; and Figure 5 is an enlarged fragmentary side elevational view of the ground engaging end of the device of Figure 1 and shows the intermeshed relationship of toothed drag elements of the device.

Referring now to the drawings in detail, it will be seen that there is illustrated the antiskid device which is the subject of this invention, the antiskid device being referred to in general by the reference numeral 10. The antiskid device 10 includes a frame which includes a pair of spaced parallel longitudinally extending frame rails 12 which are connected together intermediate their ends by a transversely extending frame member 14. It will be noted that the transversely extending frame member 14 is secured to the longitudinal frame rails by fasteners 16, and that the fasteners 16 also secure to the frame member 14 a horizontal flange 18 of a mounting bracket which is referred to in general by the reference numeral 20.

The mounting brackets 20 disposed at opposite sides of the frame include vertical flanges 22 which are transversely aligned. Each of the vertical flanges 22 is provided with a suitable bearing 24, the bearings 24 being aligned and having extending therethrough for rotation a transverse shaft 26.

Rigidly secured to the transverse shaft 26 in overlying relation thereto is an elongated mounting plate 28. The mounting plate 28 has secured to the underside thereof in spaced parallel relation carriages 30. The carriages 30 are suitably secured to the plate 28 for removal by fasteners 32.

Each of the carriages 30 extends downwardly from the underside of the plate 28 and is in alignment with a similar carriage which extends longitudinally from the plate 28 in an opposite direction. In other words, the carirages 30 are arranged in longitudinal pairs with one of the carriages 30 of each pair extending downwardly and forwardly and the other carriage of each pair extending downwardly and rearwardly.

Each of the carriages 30 is generally channel-shaped in cross-section and has carried at the lower end thereof a transversely extending axle 34. Mounted on the axle 34 on opposite sides of the carriage 30 are ground engaging disks 36. It is to be understood that the disks 36 are selectively pivoted into engagement with the icy or snowy surface on which a vehicle is passing so as to firmly dig into the ice or snow and prevent further side skidding of the rear of a vehicle.

Referring now to Figure 3 in particular, it will be seen that carried by the other ends of the frame member 14 are vertically extending bearings 38. Rotatably journaled on each of the bearings 38 is a vertical shaft 40. Carried by the vertical shaft 40 beneath the frame member 14 and rigidly secured to the vertical shaft is a fork 42. The fork 42 extends downwardly and rearwardly from its associated vertical shaft 40. Extending between lower ends of legs of the forks 42 are transverse axles 44. Mounted on each transverse axle 44 is a pair of spaced parallel ground engageable disks 46. It will be understood that the fork 42, the axle 44 and the disk 46 form a caster.

Carried by the upper portion of the vertical shaft 40 is a first bevel gear 48. The first bevel gear 48 is intermeshed with a second bevel gear 50 which is carried by the transverse shaft 26. Thus, it will be seen that when the fork 42 is pivoted, the shaft 40 will rotate and result in the rotation of the transverse shaft 26 to pivot the carriages 30 and their disks 36, whereby the disks 36 are moved into ground engaging positions.

In order that twisting action on the bearings 38 may be greatly diminished, each of the vertical shafts 40 is provided with a reduced upper end 52. The upper end 52 of the shafts 40 are journaled in a transverse bar 54 which extends between the two shafts 40.

Referring now to Figures 1, 2 and 3 in particular, it will be seen that there is illustrated a conventional vehicle which is referred to in general by the reference numeral 56. The vehicle 56 includes rear wheels 58 supported by rear axles 60. The rear axles 60 are rotatably journaled in a rear axle housing 62.

In order that the frame of the antiskid device 10 may be conveniently attached to the vehicle 56, each of the longitudinal frame rails 12 is provided at its forward end with a clamp 64. The clamp 64 is suitably secured around the axle housing 62 and connected to the forward end of its associated longitudinal frame rail 12 by a fastener 66. In order to facilitate pivoting of the clamp 64 about the axle housing 62, there is provided a resilient sleeve 68.

Removably secured to the rear end of each of the longitudinal frame rails 12 by fasteners 70 is a mounting bracket 72 which includes a horizontal sleeve portion 74. Pivotally mounted in the sleeve portion 74 is a horizontal leg 76 of a hanger 78. The hanger 78 has a threaded upper portion 80 which passes through a mounting bar 82. The mounting bar 82 is suitably secured to brackets 84 for a rear bumper 86 of the vehicle 56 and extends transversely across the rear of the vehicle 56.

In order that the frame of the antiskid device 10 may be selectively positioned relative to the ground, the hangers 78 are provided with collars 88 adjacent their lower ends. Carried by each of the hangers 78 and engaging the collar 88 thereof with its lower end is a coil spring 90. The upper end of the coil spring 90 engages the underside of the bar 82 and urges the hanger 78 downwardly. The hanger 78 is adjusted vertically by a nut 92 adjustably threaded thereon.

In the operation of the antiskid device 10, it will be seen that when the rear portion of the vehicle 56 has a tendency to skid in one direction, the disks 46, which have dug into the ice or snow on which the vehicle 56 is running, have a tendency to continue going forwardly with the result that the vertical shafts 38 are rotated. This results in the rotation of the transverse shaft 26 to pivot certain of the carriages downwardly while others of the carriages pivot upwardly, as is best illustrated in dotted lines in Figure 1. The carriages 30 which have pivoted downwardly have their disks 36 moved into engagement with the ice or snow surface on which the vehicle 56 is running. Inasmuch as the disks 36 firmly dig into the surface on which the vehicle 56 is running, and since the carriages 30 are rigidly mounted against twisting, it will be seen that further side skidding of the vehicle 56 is eliminated. It will be understood that when the vehicle 56 skids in an opposite direction, the shaft 38 will turn in an opposite direction with the result that the others of the carriages and their associated disks 36 will be pivoted downwardly.

It is to be understood that the antiskid device 10 need only be utilized when the vehicle to which it is attached, for example, the vehicle 56, is running over an icy or snowy surface. When the conditions of roads are normal and there is little or no danger of the skidding of the vehicle 56, the nuts 92 may be tightened to decrease the effective length of the hangers 78 and elevate the frame of the antiskid device 10 whereby the disks 46 are moved out of engagement with the surface on which the vehicle 56 is running.

It will be seen that the clearance between the upper portion of the antiskid device 10 and the bottom 94 of the trunk of the vehicle 56 is such that only limited upward movement of the antiskid device 10 is permitted. However, when the antiskid device 10 is utilized in combination with vehicles having a greater clearance, the hangers 78 may be disengaged from the support bar 82 and their positions with respect to the frame rails 12 reversed so that the frame rails 12 will be above the bar 82. Thus, a greater amount of clearance may be obtained for the disks 46.

In order that the vehicle 56 may be prevented from skidding forwardly when the brakes thereof are applied, the antiskid device 10 also includes means for engaging the surface on which the vehicle 56 is running to slow forward movement thereof when the brakes are applied. As is best illustrated in Figure 4, carried by the underside of the frame member 14 is a pair of transversely extending pivot pins 100. The pivot pins 100 are in longitudinally spaced, parallel relation and pivotally connected to the rearmost pivot pin 100 is a bar 102. The bar 102 has an end portion 104 which is disposed at a slight angle to the main portion thereof. Pivotally connected to the forwardmost of the pivot pins 100 is a bar 106 which has an end portion 108 which is bent at a relatively great angle to the main portion thereof. It will be seen that the relationship of the end portions 104 and 108 are such that when the bars 102 and 106 are pivoted downwardly, the end portions 104 and 108 will be in parallel relation with respect to the ground.

Referring now to Figure 5 in particular, it will be seen that there is illustrated the end portion 104 of the bar 102. Carried by the end portion 104 on the underside thereof is a pair of U-shaped rods 110. Mounted on each of the U-shaped rods 110 is a toothed drag element 112. The teeth of the drag elements 112 are intermeshed so as to prevent rotation of the drag elements 112. Thus, it will be seen that when the bars 102 and 106 are pivoted downwardly to the positions illustrated in Figure 4 by the dotted lines, the drag elements 112 will engage the ground and slow forward movement of the vehicle 56. It is to be understood that the mounting of the drag elements 112 of the end portion 108 of the bar 106 is the same as that described above relative to the end portion 104.

The antiskid device 10 includes two sets of such bars 102 and 106, the individual sets being transversely spaced. In order that the sets of bars 102 and 106 may be moved to operative positions, there is provided an operating member which is in the form of a yoke 114. The yoke 114 has rearwardly extending legs 116 which are pivotally connected to the bars 106 as at 118. In order that the bars 102 may be moved downwardly simultaneously with the downward pivoting of the bars 106, they are connected to the bars 106 by links 120.

Connected to the central portion of the yoke 114 is one end of a flexible cable 122. The flexible cable has its other end connected to a brake pedal (not shown) of the vehicle 56 so that when the brake pedal 56 is actuated, the flexible cable 122 will be tensioned to move the yoke 114 in an operating position. In order to prevent breakage of the flexible cable 122, it is provided intermediate its ends with a tension spring 124. Thus, when the drag elements 112 engage the ground and the brake pedal is further pushed forwardly, the spring 124 will tension to prevent breakage of any parts of the drag device. The bars 102 and 106 are normally urged upwardly away from the ground by springs 126 carried by the rearmost pivot pins 100.

Inasmuch as the drag portion of the antiskid device 10 is carried by the frame of the antiskid device, it will be seen that when the frame is moved upwardly to move the antiskid device 10 to an inoperative position, the drag portion will also be moved to an inoperative position.

Although the invention has been specifically described as being intended for use on ice and snow coated roads, it is not intended that the invention be so limited in use. If it is so desired, the invention may be utilized to advantage on rainy days and could be utilized on dry roads.

From the foregoing, the construction and operation of the device will be readily understood and further explanation is believed to be unnecessary. However, since numerous modifications and changes will readily occur to those skilled in the art, it is not desired to limit the invention to the exact construction shown and described,

What is claimed as new is as follows:

1. An antiskid device for vehicles comprising a frame securable beneath a rear portion of a vehicle, a transverse shaft rotatably carried by said frame, an antiskid element carried by said shaft for movement to ground engaging position upon rotary movement of said shaft, means carried by said frame in driving engagement with said shaft for rotating said shaft in a direction to move said anti-skid element to said ground engaging position in response to skidding of a vehicle, said means including a vertical shaft at one end of said transverse shaft, meshing gears on said vertical shaft and said transverse shaft, ground engaging means carried by said vertical shaft for rotation of said vertical shaft in response to side movement of said ground engaging means.

2. An antiskid device for vehicles comprising a frame securable beneath a rear portion of a vehicle, a transverse shaft rotatably carried by said frame, an antiskid element carried by said shaft for movement to ground engaging position upon rotary movement of said shaft, means carried by said frame in driving engagement with said shaft for rotating said shaft in a direction to move said antiskid element to said ground engaging position in response to skidding of a vehicle, said means including a vertical shaft at one end of said transverse shaft, meshing gears on said vertical shaft and said transverse shaft, ground engaging means carried by said vertical shaft for rotation of said vertical shaft in response to side movement of said ground engaging means, said ground engaging means including a caster.

3. An antiskid device for vehicles comprising a frame securable beneath a rear portion of a vehicle, a transverse shaft rotatably carried by said frame, an antiskid element carried by said shaft for movement to ground engaging position upon rotary movement of said shaft, means carried by said frame in driving engagement with said shaft for rotating said shaft in a direction to move said antiskid element to said ground engaging position in response to skidding of a vehicle, said means including a vertical shaft at one end of said transverse shaft, meshing gears on said vertical shaft and said transverse shaft, ground engaging means carried by said vertical shaft for rotation of said vertical shaft in response to side movement of said ground engaging means, said ground engaging means including a caster having spaced wheel forming disks.

4. An antiskid device for vehicles comprising a frame securable beneath a rear portion of a vehicle, a transverse shaft rotatably carried by said frame, an antiskid element carried by said shaft for movement to ground engaging position upon rotary movement of said shaft, means carried by said frame in driving engagement with said shaft for rotating said shaft in a direction to move said antiskid element to said ground engaging position in response to skidding of a vehicle, said antiskid element including a carriage rigidly secured to said transverse shaft, ground engaging disks carried by opposite ends of said carriage.

5. An antiskid device for vehicles comprising a frame securable beneath a rear portion of a vehicle, a transverse shaft rotatably carried by said frame, an antiskid element carried by said shaft for movement to ground engaging position upon rotary movement of said shaft, means carried by said frame in driving engagement with said shaft for rotating said shaft in a direction to move said antiskid element to said ground engaging position in response to skidding of a vehicle, said means including a vertical shaft at one end of said transverse shaft, meshing gears on said vertical shaft and said transverse shaft, ground engaging means carried by said vertical shaft for rotation of said vertical shaft in response to side movement of said ground engaging means, said antiskid element including a carriage rigidly secured to said transverse shaft, a ground engaging disk carried by at least one end of said carriage.

6. An antiskid device for vehicles comprising a frame securable beneath a rear portion of a vehicle, a transverse shaft rotatably carried by said frame, an antiskid element carried by said shaft for movement to ground engaging position upon rotary movement of said shaft, means carried by said frame in driving engagement with said shaft for rotating said shaft in a direction to move said antiskid element to said ground engaging position in response to skidding of a vehicle, said means including a vertical shaft at one end of said transverse shaft, meshing gears on said vertical shaft and said transverse shaft, ground engaging means carried by said vertical shaft for rotation of said vertical shaft in response to side movement of said ground engaging means, said ground engaging means including a caster, said antiskid element including a carriage rigidly secured to said transverse shaft, a ground engaging disk carried by at least one end of said carriage.

7. An antiskid device for vehicles comprising a frame securable beneath a rear portion of a vehicle, a transverse shaft rotatably carried by said frame, an antiskid element carried by said shaft for movement to ground engaging position upon rotary movement of said shaft, means carried by said frame in driving engagement with said shaft for rotating said shaft in a direction to move said antiskid element to said ground engaging position in response to skidding of a vehicle, said frame including a pair of longitudinal frame rails, means at the forward ends of said frame rails for pivotal attachment to a vehicle axle, hangers at the rear ends of said frame rails for suspending said frame from a vehicle rear bumper assembly.

8. An antiskid device for vehicles comprising a frame securable beneath a rear portion of a vehicle, a transverse shaft rotatably carried by said frame, an antiskid element carried by said shaft for movement to ground engaging position upon rotary movement of said shaft, means carried by said frame in driving engagement with said shaft for rotating said shaft in a direction to move said antiskid element to said ground engaging position in response to skidding of a vehicle, said frame including a pair of longitudinal frame rails, means at the forward ends of said frame rails for pivotal attachment to a vehicle axle, hangers at the rear ends of said frame rails for suspending said frame from a vehicle rear bumper assembly, said hangers being adjustably positionable to facilitate movement of said frame to an elevated position to render the antiskid device inoperative.

9. An antiskid device for vehicles comprising a frame securable beneath a rear portion of a vehicle, a ground engageable antiskid element movably carried by said frame, means for moving said antiskid element into engagement with the ground, said frame including a pair of longitudinal frame rails, means at the forward ends of said frame rails for pivotal attachment to a vehicle axle, hangers at the rear ends of said frame rails for suspending said frame from a vehicle rear bumper assembly, said hangers being adjustably positionable to facilitate movement of said frame to an elevated position to render the antiskid device inoperative.

References Cited in the file of this patent

UNITED STATES PATENTS

| | | |
|---|---|---|
| 1,334,644 | Atherton | Mar. 23, 1920 |
| 1,486,730 | Collette | Mar. 11, 1924 |
| 1,590,329 | Stefanich | June 29, 1926 |
| 1,974,773 | Garigliano et al. | Sept. 25, 1934 |
| 2,053,692 | Borland et al. | Sept. 8, 1936 |
| 2,232,821 | Brown et al. | Feb. 25, 1941 |
| 2,650,679 | Durkin | Sept. 1, 1953 |

FOREIGN PATENTS

| | | |
|---|---|---|
| 5,391 | Great Britain | Mar. 3, 1910 |